(12) United States Patent
Stalsberg

(10) Patent No.: US 6,662,682 B2
(45) Date of Patent: Dec. 16, 2003

(54) DYNAMIC BALANCING APPLICATION MASS PLACEMENT

(75) Inventor: Kevin J. Stalsberg, White Bear Lake, MN (US)

(73) Assignee: Honeywell International Inc., Morristown, NJ (US)

( * ) Notice: Subject to any disclaimer, the term of this patent is extended or adjusted under 35 U.S.C. 154(b) by 63 days.

(21) Appl. No.: 10/001,090

(22) Filed: Nov. 15, 2001

(65) Prior Publication Data
US 2003/0101846 A1 Jun. 5, 2003

(51) Int. Cl.[7] .................................. F16F 15/10
(52) U.S. Cl. ........................ 74/573 R; 74/574
(58) Field of Search .................. 68/23.1, 23.2; 8/159; 74/573 R, 573 F, 594 F, 574

(56) References Cited

U.S. PATENT DOCUMENTS

| | | | |
|---|---|---|---|
| 3,799,348 A | 3/1974 | Mazza | 210/144 |
| 3,983,035 A | 9/1976 | Arkeveld et al. | 210/138 |
| 4,000,658 A | 1/1977 | Schmidt | 73/490 |
| 4,157,781 A | 6/1979 | Maruyama | 233/23 A |
| 4,322,641 A | 3/1982 | Packard | 307/521 |
| 4,694,156 A | 9/1987 | Swanberg | 250/214 |
| 4,991,247 A | 2/1991 | Castwall et al. | 8/158 |
| 5,150,314 A | 9/1992 | Garratt et al. | 364/571.02 |
| 5,280,660 A | 1/1994 | Pellerin et al. | 8/158 |
| 5,325,677 A | 7/1994 | Payne et al. | 68/12.04 |
| 5,376,063 A | 12/1994 | Greenstein | 494/37 |
| 5,490,436 A | 2/1996 | Coyne et al. | 74/573 |
| 5,561,993 A | 10/1996 | Elgersma et al. | 68/23.2 |
| 5,582,040 A | 12/1996 | Khan | 68/23.2 |
| 5,692,313 A | 12/1997 | Ikeda et al. | 34/58 |
| 5,715,731 A | 2/1998 | Koch | 74/573 |
| 5,729,025 A | 3/1998 | Erickson et al. | 250/574 |
| 5,731,868 A | 3/1998 | Okey et al. | 356/73 |
| 5,757,481 A | 5/1998 | O'Brien et al. | 356/243 |
| 5,761,932 A | 6/1998 | Kim | 68/23.2 |
| 5,761,933 A | 6/1998 | Kim et al. | 68/23.2 |
| 5,765,402 A | 6/1998 | Ikeda et al. | 68/12.06 |
| 5,800,628 A | 9/1998 | Erickson et al. | 134/18 |
| 5,850,748 A | 12/1998 | Kim et al. | 68/23.2 |
| 5,862,553 A | 1/1999 | Harberl et al. | 8/159 |
| 5,870,907 A | 2/1999 | Cho | 68/23.1 |
| 5,893,280 A | 4/1999 | Honda et al. | 68/12.06 |
| 5,913,951 A | 6/1999 | Herr et al. | 8/158 |
| 5,921,148 A | 7/1999 | Howell | 74/573 |
| 5,923,433 A | 7/1999 | Giuffre et al. | 356/440 |
| 5,957,144 A | 9/1999 | Neff et al. | 134/56 D |
| 5,960,804 A | 10/1999 | Cooper et al. | 134/56 D |
| 5,979,236 A | 11/1999 | Hong et al. | 73/458 |
| 6,007,640 A | 12/1999 | Neff et al. | 134/18 |
| 6,029,300 A | 2/2000 | Kawaguchi et al. | 8/159 |
| 6,047,428 A | 4/2000 | Min | 8/159 |
| 6,077,423 A | 6/2000 | Roy et al. | 210/121 |
| 6,082,151 A | 7/2000 | Wierzba et al. | 68/23.2 |
| 6,129,768 A | 10/2000 | Johnson et al. | 8/159 |
| 6,130,928 A | 10/2000 | Jamzadeh et al. | 377/23 |
| 6,144,447 A | 11/2000 | Ohman et al. | 356/246 |
| 6,148,647 A | 11/2000 | Kabeya et al. | 68/140 |
| 6,159,384 A | 12/2000 | Roberts et al. | 210/741 |
| 6,532,422 B1 * | 3/2003 | Elgersma et al. | 68/23.2 |

FOREIGN PATENT DOCUMENTS

EP 1 036 875 A2 9/2000 .......... D06F/39/08

* cited by examiner

Primary Examiner—Christopher P. Schwartz
(74) Attorney, Agent, or Firm—Kris T. Fredrick; Kermit D. Lopez; Luis Ortiz

(57) ABSTRACT

Methods and systems for distributing mass across a limited number of receiving receptacles associated with a rotating device or rotating system in order to affect a balance control action for dynamically balancing the rotating device or rotating system are disclosed. Out-of-balance forces and motion can be continually determined and utilized to estimate balance control actions. A determined balance control action may be represented as a force magnitude to be applied at a specific angular point of an axial control plane. The counterbalancing action distributes mass across a ringed distribution of retaining receptacles on the axial control plane of the rotating apparatus.

23 Claims, 8 Drawing Sheets

DYNAMIC BALANCING APPLICATION MASS PLACEMENT

RELATED APPLICATIONS

This application is related to co-pending and co-owned patent applications entitled: 'Method and Apparatus for Reducing Microprocessor Speed Requirements in Data Acquisition Applications,' U.S. Ser. No. 09/792,996, filed on Feb. 26, 2001; 'Method and System for Detecting Fluid Injection from Stationary to Rotating Members,' U.S. Ser. No. 09/951,790, filed on Sep. 10, 2001; 'Simultaneous Injection Method and System for a Self-Balancing Rotatable Apparatus,' U.S. Ser. No. 09/896,763, filed on Jun. 29, 2001; 'Energy-Based Thresholds Applied to Dynamic Balancing,' U.S. Ser. No. 09/951,798, filed Sep. 10, 2001; 'Dynamic Correlation Extension for a Self-Balancing Rotatable Apparatus' U.S. Ser. No. 09/951,932, filed on Sep. 10, 2001; 'Continuous Flow Method and System for Placement of Balancing Fluid on a Rotating Device Requiring Dynamic Balancing', U.S. Ser. No. 10/001,006, filed on Nov. 15, 2001; 'Fixed-Bandwidth Correlation Window Method and System for a Self-Balancing Rotatable Apparatus,' U.S. Ser. No. 09/999,594, filed on Nov. 15, 2001; 'Supervisory Method and System for Improved Control Model Updates Applied to Dynamic Balancing,' U.S. Ser. No. 10/011,218, filed on Nov. 15, 2001; 'Data Manipulation Method and System for a Self-Balancing Rotatable Apparatus,' U.S. Ser. No. 10/000,882, filed on Nov. 15, 2001; 'Resonance Identification Extension for a Self-Balancing Rotatable Apparatus,' U.S. Ser. No. 10/001,098, filed on Nov. 15, 2001; 'Method and System for Mechanizing Simultaneous Multi-Actuator Actions Applied to Dynamic Balancing,' U.S. Ser. No. 10/000,255, filed on Nov. 15, 2001.

TECHNICAL FIELD

The present invention relates generally to rotatable members that are able to achieve balanced conditions throughout a range of rotational speeds. The present invention also relates to methods and systems for dynamically balancing rotatable members through the continual determination of out-of-balance forces and motion to thereby take corresponding counter balancing action. The present invention additionally relates to methods and systems for actively placing inertial masses within a rotating body in order to cancel rotational imbalances associated with the rotating body thereon. In addition, the present invention relates to algorithms that achieve the desired point-mass and point-location counterbalance actions through a distributed placement of mass across a limited number of receiving receptacles on the rotating body.

BACKGROUND OF THE INVENTION

When rotatable objects are not in perfect balance, non-symmetrical mass distribution creates out-of-balance forces because of the centrifugal forces that result from the rotation of the object. This mass unbalance can result in machine vibrations that are synchronous with the rotational speed. Such vibrations can lead to excessive wear and unacceptable levels of noise.

Balancing of a rotatable body is commonly achieved by adjusting a distribution of moveable, inertial masses attached to the body. In general, this state of balance may remain until there is a disturbance to the system. A tire, for instance, can be balanced once by applying weights to it and the tire will remain balanced until it hits a very big bump or the weights are removed. However, certain types of bodies that have been balanced in this manner will generally remain in balance only for a limited range of rotational velocities. One such body is a centrifuge for fluid extraction, which can change the degree of balance as speed is increased and more fluid is extracted.

Many machines are also configured as freestanding spring mass systems in which different components thereof pass through resonance ranges during which the machine may become out of balance. Additionally, such machines may include a rotating body loosely coupled to the end of a flexible shaft rather than fixed to the shaft as in the case of a tire. Thus, moments about a bearing shaft may also be created merely by the weight of the shaft. A flexible shaft rotating at speeds above half of its first critical speed can generally assume significant deformations, which add to the imbalance.

Machines of this kind usually operate above their first critical speed. As a consequence, machines that are initially balanced at relatively low speeds may tend to vibrate excessively as they approach full operating speed. Additionally, if one balances to an acceptable level rather than to a perfect condition (which is difficult to measure), the small remaining "out-of-balance" will progressively apply greater force as the speed increases. This increase in force is due to the fact that F is proportional to $r\omega^2$, (note that F is the out-of-balance force, r is the radius of the rotating body and $\omega$ is its rotational speed).

The mass unbalance distributed along the length of a rotating body gives rise to a rotating force vector at each of the bearings that support the body. In general, the force vectors at respective bearings are not in phase. At each bearing, the rotating force vector can be opposed by a rotating reaction force, which can be transmitted to the bearing supports as noise and vibration. The purpose of active, dynamic balancing is to shift an inertial mass to the appropriate radial eccentricity and angular position for canceling the net unbalance. At the appropriate radial and angular distribution, the inertial mass can generate a rotating centrifugal force vector equal in magnitude and phase to the reaction force referred to above. Although rotatable objects find use in many different applications, one particular application is a rotating drum of a washing machine.

Many different types of balancing schemes are known to those skilled in the art. U.S. Pat. No. 5,561,993, which was issued to Elgersma et al. on Oct. 22, 1996, and is incorporated herein by reference, discloses a self-balancing rotatable apparatus. Elgersma et al. disclosed a method and system for measuring forces and motion via accelerations at various locations in a system. The forces and moments were balanced through the use of a matrix manipulation technique for determining appropriate counterbalance forces located at two axial positions of the rotatable member. The method and system described in Elgersma et al. accounted for possible accelerations of a machine, such as a washing machine, which could not otherwise be accomplished if the motion of the machine were not measured. Such a method and system was operable in association with machines not rigidly attached to immovable objects, such as concrete floors. The algorithm disclosed by Elgersma et al. permitted counterbalance forces to be calculated even when the rotating system (such as a washing machine), was located on a flexible or mobile floor structure combined with carpet and padding between the washing machine and a rigid support structure.

U.S. Pat. No. 5,561,993 thus described a dynamic balance control algorithm for balancing a centrifuge for fluid extraction. To accomplish such balance control, balance control actions may place mass at the periphery of axial control planes on the centrifuge. Related sensor responses to balancing control actions on a centrifuge can be modeled and utilized to determine control actions (i.e., balance control actions) that would serve to drive an associated system toward a balanced state. Such a system is generally time variant, such that the control models utilized therein may need to be routinely updated based on the measured response to a previous control action, which is a variation of perturbation theory, well known in the art. The control actions may require multiple control actuators, generally one per axial control plane, although multiple actuators at multiple control planes may emulate additional virtual control planes.

The determined counterbalance control action (i.e., balance control action) is generally represented as a force or mass (regarding $r\omega^2$) magnitude to be applied at a specific angular point along the periphery of an axial control plane on the centrifuge. A variety of control action actuation techniques have been developed that generally depend on placement of mass across a ringed distribution of retaining receptacles on the rotating apparatus, to affect the desired control action. For a large number of retaining receptacles, counterbalance mass could simply be distributed at an angular span symmetric about the determined counterbalance angular point. Such a technique for distributing counterbalance mass does not take into account that a mechanically and monetarily feasible device would be confined to having a limited number of receptacles. With fewer receptacles the mass is less confined and it is not possible to affect the desired control action with a simple symmetric distribution about the determined counterbalance angular point.

Based on the foregoing, it can be appreciated that a method and system are required to affect a desired control action whereby counterbalance mass is distributed about the rotating system utilizing a limited number of retaining receptacles. The invention disclosed herein thus addresses these needs and the related concerns.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is one aspect of the present invention to provide methods and systems in which rotatable members can achieve balanced conditions throughout a range of rotational speeds.

It is another aspect of the present invention to provide methods and systems for dynamically balancing rotatable members through the continual determination of out-of-balance forces and motion to thereby take corresponding counter balancing action.

It is yet another aspect of the present invention to provide methods and systems for dynamically balancing rotatable members wherein counterbalancing action distributes mass in receptacles occupying a given angular span about the rotating system, wherein the receptacles are greatly limited in number and mass additions are confined to these receptacles.

It is still another aspect of the present invention to provide methods and systems for dynamically balancing rotatable members where the amount of counter balancing mass placed at various sites about the rotating system is determined through a mass placement algorithm.

In accordance with various aspects of the present invention, methods and systems are disclosed herein for distributing counterbalance mass across a limited-number collection of retaining receptacles in order to affect a control action to dynamically balance the rotating system. A determined counterbalance control action can be represented as a force or mass (regarding $r\omega^2$) magnitude to be applied at a specific angular point along the periphery of an axial control plane on a rotating apparatus. The control action can be accomplished through the placement of mass across a ringed distribution of retaining receptacles on the rotating apparatus. With the number of receptacles greatly restricted, a mass placement algorithm may determine how mass can be proportioned across a span of receptacles and incrementally applied to efficiently affect the desired radial counterbalance force at its designated angular point-location. The counterbalance mass distribution can be determined such that force elements normal to the counterbalance angular point-location, and introduced because of the distributed control action, cancel each other or sum to zero.

Depending on the limited number of retention receptacles and the desired angular span for distributing counterbalance mass, the mass placement algorithm may operate by placing as much mass as possible starting with a primary receptacle or cup associated with the counterbalance angular point-location. It then may sequence through alternating, adjacent receptacles, until the desired angular span is reached, where the last cup is used to zero any remaining force component that is normal to the desired counter-balance action direction. There may be additional limit and sizing activities that ensure that an integer number of steps is used to achieve the desired counterbalance point-mass effect and that actuator timing limits are not violated. As the number of retention receptacles increases, the need for the mass placement algorithm becomes less critical as the error in distributed mass placement is bound by one receptacle.

BRIEF DESCRIPTION OF THE DRAWINGS

The accompanying figures, in which like reference numerals refer to identical or functionally similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

The present invention involves the placement of balancing mass on a rotatable member, associated with control model formulation, prediction of balance control actions, and balance control actions. The basic configuration and concepts explained in U.S. Pat. No. 5,561,993 are discussed herein for illustrative purposes only in order to help explain the present invention but do not limit the scope of the present invention, including preferred embodiments discussed herein.

Figure 1:
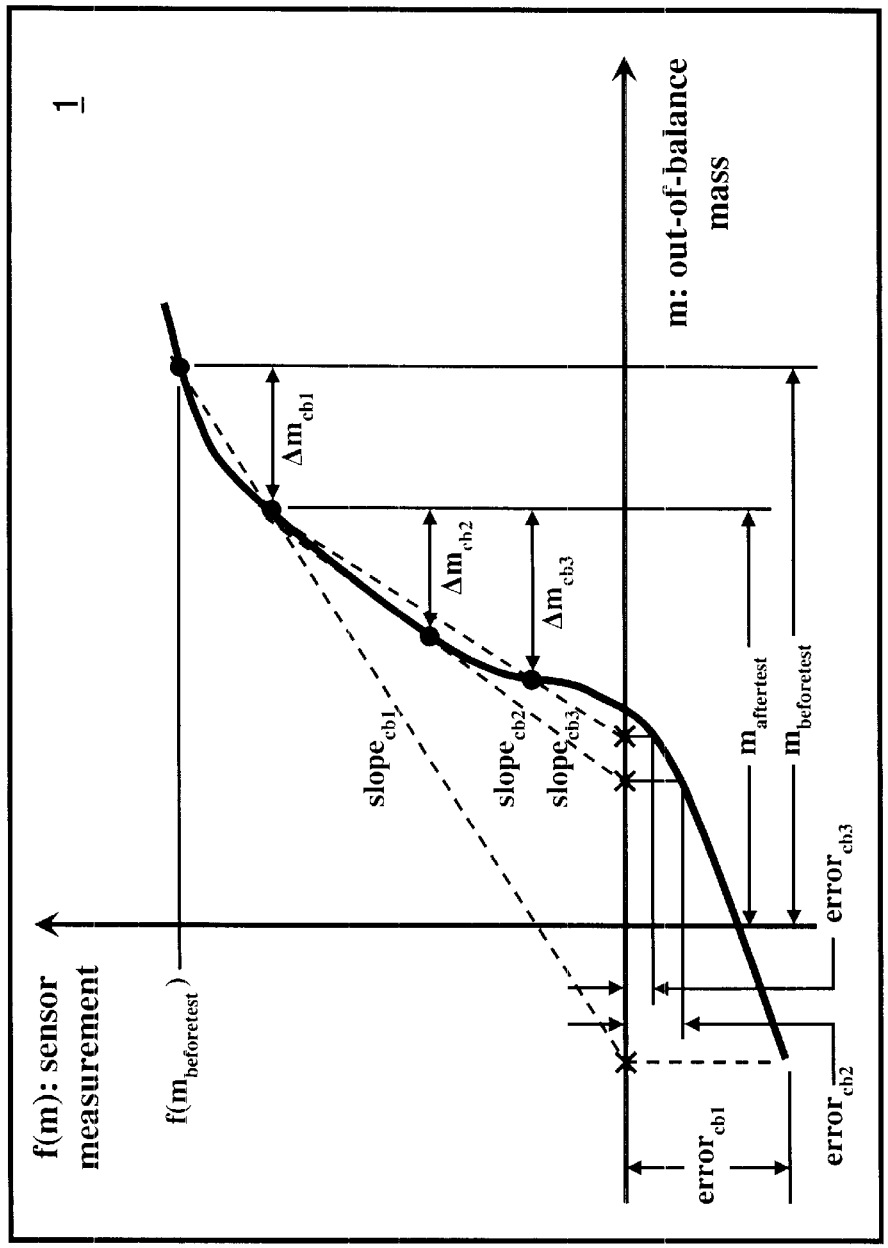
FIG. 1 depicts a plot of a non-linear system, in accordance with preferred embodiments of the present invention.

FIG. 1 depicts a plot of a non-linear system 1 in accordance with preferred embodiments of the present invention. Given a very simple (e.g., one-dimensional) non-linear system, such as the non-linear system in FIG. 1, the system can be balanced when the sensor measurement f(m) is driven to zero. The objective of such a system is to find a value for a counterbalance Δm, such that the sensor measurement f(m) is driven to zero, i.e., f(m)=0. Utilizing a Taylor's series expansion in the vicinity of the anticipated operating range and neglecting second order and higher terms, one can generate a linear model of the form y=b+mx. The linear model can be written to reflect the example illustrated in FIG. 1, where several possible line estimates are shown; equation 1 expresses this relationship.

$$f(m_{next}) \approx f(m_{aftertest}) + \left(\frac{\partial f(m)}{\partial m}\right) \cdot (m_{next} - m_{aftertest}) \quad (1)$$

Those skilled in the art can appreciate that $f(m_{next})$ represents the desired sensor measurement. In addition, $f(m_{aftertest})$ can represent the sensor measurement after a test or a prior balance-control action. The variable m generally represents the out-of-balance in the system. For example, the variable $m_{aftertest}$ generally represents the out-of-balance after a test action ($\Delta m_{test}$), and the change in m (i.e., $\Delta m = m_{next} - m_{aftertest}$) is the counterbalance required to achieve a desired sensor measurement ($f(m_{next})=0$). The control action involves progressively moving in the direction of the estimated counterbalance and updating the system model and the required counterbalance estimate as control progresses. Those skilled in the art can appreciate that this control implementation of equation 1 represents the well-known Newton Raphson iteration method.

Since the objective is to find $f(m_{next})=0$, the general form of equation 1 reduces to:

$$m_{next} = m_{aftertest} - \left[\frac{\partial f(m)}{\partial m}\right]^{-1} \cdot f(m_{aftertest}) \quad (2)$$

where $m_{next}$ is the solution or system out-of-balance needed to make $f(m_{next})=0$ or to drive the sensor measurement to zero. Thus, the estimated mass change $\Delta m_{cb}$ generally required for counterbalance action is illustrated in equation 3.

$$\Delta m_{cb} = m_{next} - m_{aftertest} = -f(m_{aftertest}) \Big/ \left(\frac{\partial f}{\partial m}(m_{aftertest})\right) \quad (3)$$

The partial derivative, or slope of the sensor function, can be found by perturbing the system. This may be generally illustrated in equation 4, which represents the change in sensor measurements due to a test action ($\Delta m_{test} = m_{aftertest} - m_{beforetest}$).

$$\frac{\partial f}{\partial m}(m_{aftertest}) = \frac{f(m_{aftertest}) - f(m_{beforetest})}{m_{aftertest} - m_{beforetest}} \quad (4)$$

Combining equations 3 and 4 may result in the generalized form shown in equation 5, which equation is generally expressed in an expanded notion of multiple inputs and outputs.

$$[f(m_{aftertest})] = -\left[\frac{\partial f(m)}{\partial m}\right] \cdot [\Delta m_{cb}] \quad (5)$$

Regarding the linear models and associated slope calculation in FIG. 1, it can be appreciated that a change in the mass may result in a change in the system, and the system itself can be nonlinear; thus, the linear model used to determine the next counterbalance may have significant error. Therefore, when applying the Newton Raphson iteration to a process, certain requirements should be followed. First, the initial approximation should be sufficiently accurate to result in subsequent operation near the desired solution. Also the measurement f(m) should be smooth, nearly linear and single-valued in the vicinity of the anticipated operation. Additionally, because higher derivatives are neglected in this type of approximation, the higher derivatives should be small, so as to avoid convergence problems.

Lastly, in applications of the Newton Raphson iteration, only one solution (counterbalance mass $\Delta m_{cb}$) should exist for the sensor measurement's being equal to zero. This means there is only one root. Even after following the above requirements, system noise can be a concern. In the hypothetical illustration of FIG. 2, a larger initial test action, which changes the system to point C, is preferable to the one that changes it to point B. This result can be illustrated by comparing the slopes of lines 22, 24 and 26, that result from the various test actions (perturbations) depicted in FIG. 2. The difference between the "before" and "after" test sensor measurements should be large enough to obtain a good approximation of the slope of the function and ensure that the resulting change in the measurement dominates the changes due to system noise.

Figure 3:
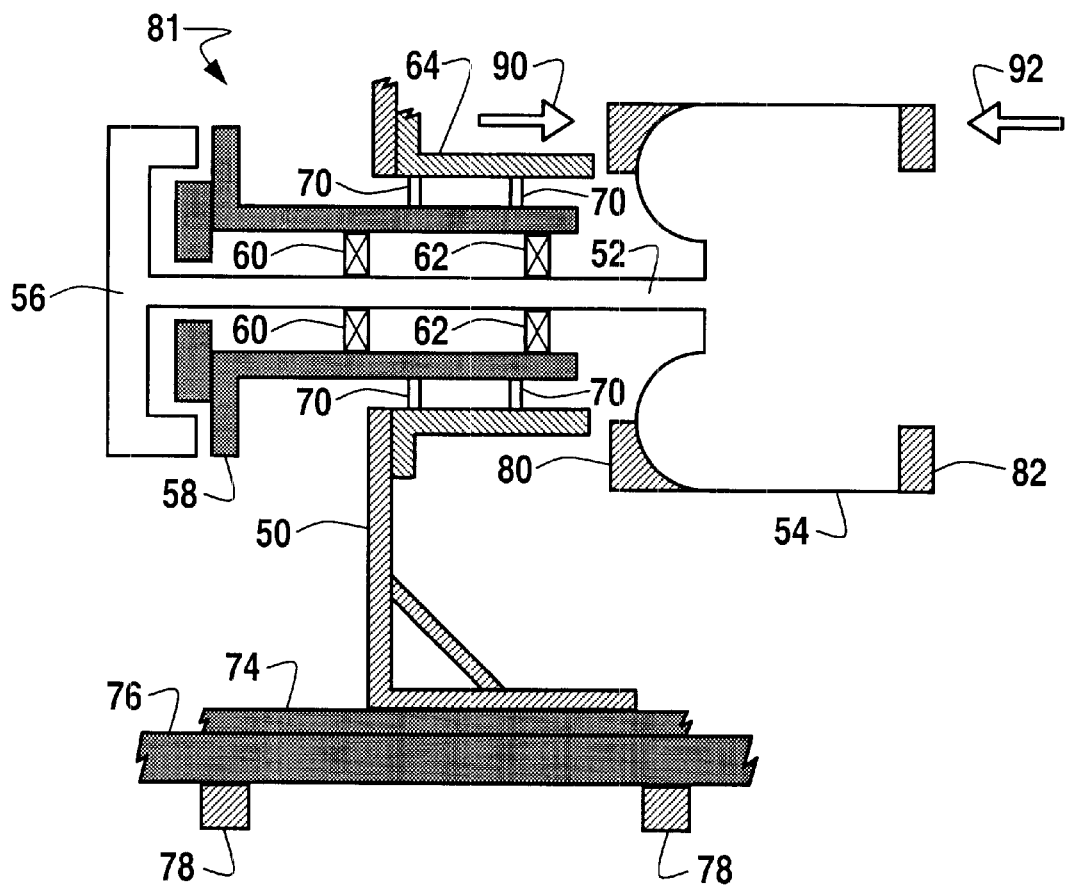
FIG. 3 depicts a schematic representation of a washing machine, which can be adapted for use in association with the present invention.

FIG. 3 depicts a schematic representation of a washing machine 81, which can be adapted for use in association with the present invention. Washing machine 81 is one type of a washing appliance that can be implemented in accordance with the method and system of the present invention. Those skilled in the art can appreciate that the present invention can be implemented within a rotating device or rotating system, such as, for example, a washing machine. Those skilled in the art can further appreciate, however, that other types of rotating systems or rotating devices can be utilized in accordance with the present invention. Note that as utilized herein, the terms "rotating system," "rotating device," "rotating apparatus," "rotatable apparatus," "rotatable system," or "rotatable device" can be utilized interchangeably. The methods and systems of the present invention can be implemented to balance rotating systems, rotating devices or rotating members thereof.

In the example of FIG. 3, a rotatable drum 54 includes a plurality of schematically illustrated back cups 80 and front cups 82. Both the back and front cups 80 and 82 can be disposed at axial ends of the rotatable drum 54 and, although not shown in FIG. 3, both the back and front cups 80 and 82 can comprise a plurality of cups dispersed around the periphery of rotatable drum 54. A quantity of water can be injected into back cups 80 and/or front cups 82 from a stationary control valve supplied with water, such as those identified by reference numerals 90 and 92. This water injection to the cups is the basic mechanism of dynamic balancing in the embodiment described in FIG. 3. Although the terms test mass or fluid injection can be used to describe the preferred embodiment, those skilled in the art can appreciate that such a test or control action can be comprised of many different materials, and the invention is not limited to fluid-based injection methodologies for placing mass.

FIG. 3 thus schematically illustrates a washing machine 81 comprising a frame 50, a shaft 52 and a rotatable drum 54. Shaft 52 can be attached to rotatable drum 54. These two components can be attached to a rotor or pulley 56 of a motor drive. Frame 50 can provide support for a bearing housing 58 in which bearings 60 and 62 are generally supported. A housing mount 64 can support bearing housing 58. A plurality of sensors identified by the reference numeral 70 is illustrated between the housing mount and the bearing housing in FIG. 3. These sensors will be described in greater detail below. Beneath frame 50 are generally shown a carpet and pad 74, a plywood support member 76 and a plurality of joists 78. The representation shown in FIG. 3 illustrates a typical application of a horizontal washing machine in a residential housing environment. Those skilled in the art can appreciate that FIG. 3 is presented for illustrative purposes only and that a variety of washing machine configurations and other rotating devices not illustrated herein can be utilized to implement varying embodiments of the present invention. Washing machine 81 is thus described herein for illustrative purposes only and is not considered a limiting feature of the present invention.

Figure 2:
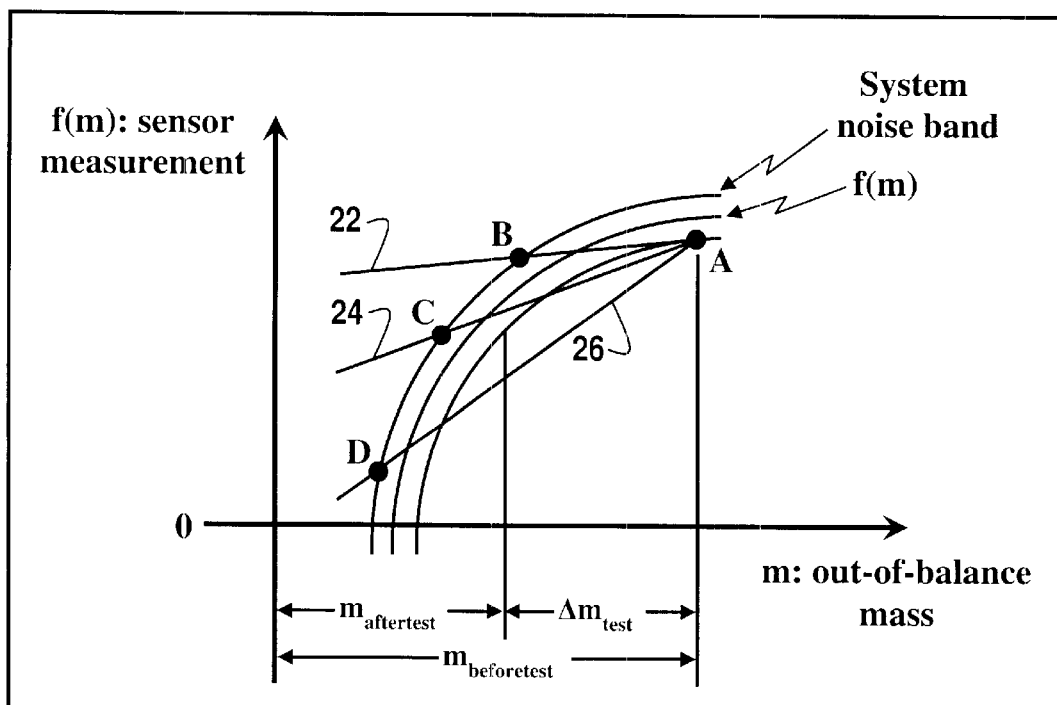
FIG. 2 illustrates a graphical representation of a nonlinear system and the effect of system noise with which the present invention is concerned.
Figure 5:
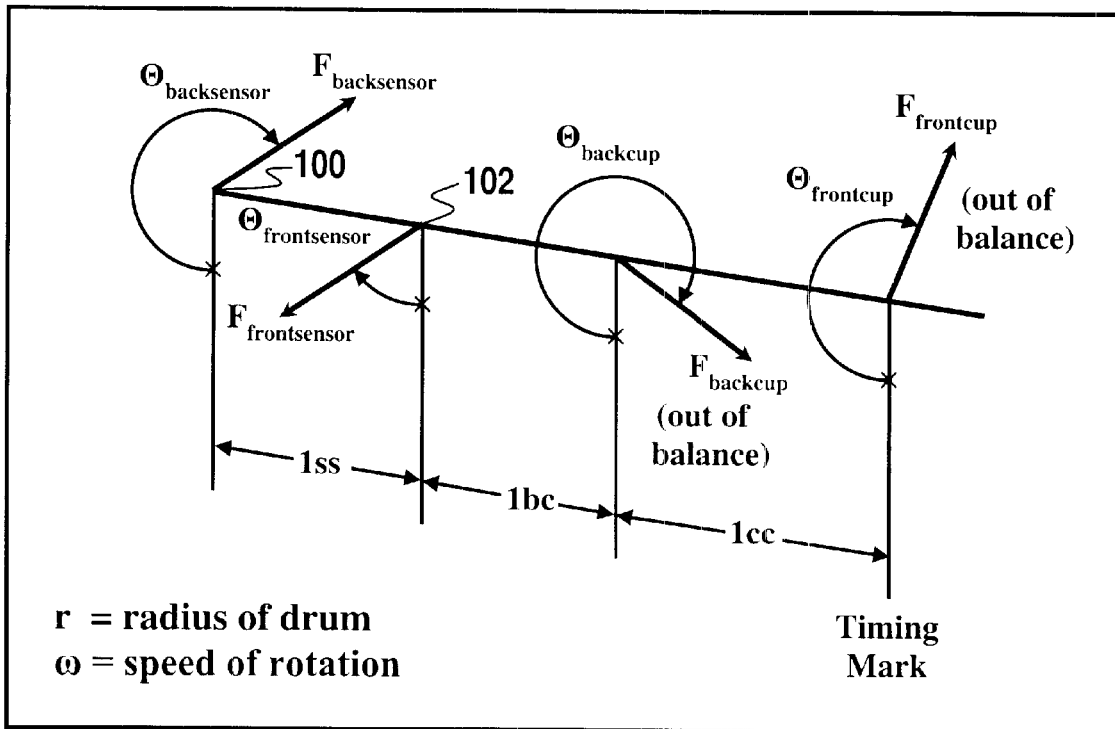
FIG. 5 depicts a three-dimensional schematic representation of the forces and critical lengths along an axis of rotation, which has been extended along a length of the shaft and through a length of the drum.

FIG. 5 illustrates a three-dimensional schematic representation of the forces and critical lengths along the axis of rotation, which has been extended along the length of the shaft and through the length of the drum. Force sensors can be mounted to measure the force transmitted between housing mount 64 and bearing housing 58, as illustrated in FIG. 2. The basic concept of dynamic balancing stipulates that vector forces at the front and back cups may represent an out-of-balance condition. Referring to FIG. 5, the system can be provided with a mechanism for sensing a first force $F_{backsensor}$ at a first location 100 of the axis of rotation and a second mechanism for measuring a second force $F_{frontsensor}$ at a second location 102 of the axis of rotation. It should be understood that both the first and second forces shown in FIG. 5 are likely to be determined from a plurality of force sensors arranged so that the resultant force vectors along multiple axes of the system can be determined at each of the first and second locations 100 and 102 of the axis of rotation.

If a washing machine or similar apparatus with a rotating member is rigidly attached to a stationary object, such as a concrete floor, a mere force and moment analysis based on forces and moment arms shown in FIG. 5 would be appropriate. This analysis would thus yield sufficient information to allow counterbalance forces to be implemented in a manner that would achieve a balance of a rotating drum 54. However, in most practical residential housing applications the machine is not rigidly attached to an immovable object and, instead, can be associated with a plurality of flexible members. Therefore, it is not practical to expect a machine of this type to be installed and operate without motion being experienced by the various portions of the machine.

Figure 4:
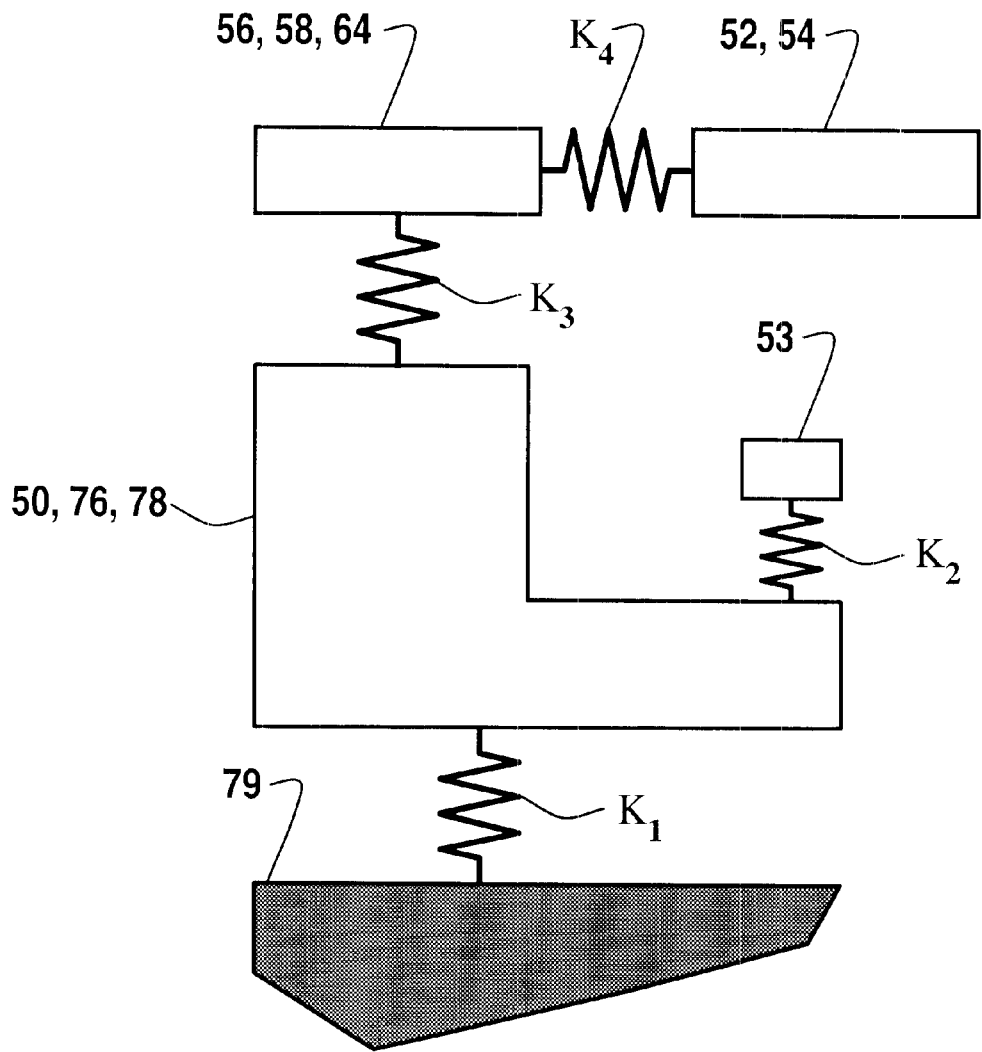
FIG. 4 illustrates a spring and mass representation depicting the manner in which a nonrigid washing machine can behave if mounted on nonrigid structures.

FIG. 4 depicts a schematic representation of a type of arrangement usually encountered in washing machine applications. FIG. 4 thus illustrates a spring and mass system depicting the manner in which a nonrigid washing machine can behave if mounted on nonrigid structures. The behavior of frame 50 in relation to footing 79 can be described as a spring connecting the frame 50 and floor 76 to the footing 79 and having a spring constant K1. The relationship between a tub 53 (not shown in FIG. 3) surrounding the rotatable drum 54 and frame 50 can be described by a spring constant K2. A spring constant K3 represents the relationship among bearing housing 58 and housing mount 64, and frame 50 in FIG. 3. Lastly, FIG. 4 illustrates a spring constant K4 that represents the bending of shaft 52 along with rotatable members 54 and 56.

Although only represented by boxes in FIG. 4, the schematic illustration depicts a multitude of mass-spring subsystems that define the relationships among major components of the overall system. One purpose for illustrating FIG. 4 is to demonstrate that the relationships among these components are not rigid and, as a result, can permit motion, resulting in accelerations, to occur in response to forces exerted on the various components. Therefore, measuring only the forces at sensors 70 shown in FIG. 3, would make accurate counterbalance determinations extremely difficult, if not impossible. Thus, it can be beneficial to measure motion relative to a footing or inertial space (e.g., acceleration) and account for it in the analysis of forces.

Figure 6:
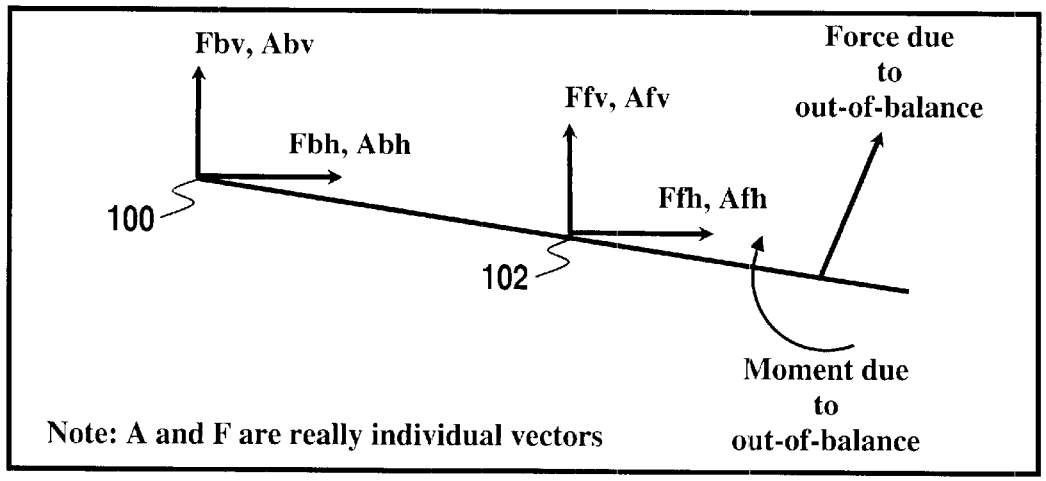
FIGS. 6 and 7 depict a graphical representation of a shaft with measured force and motion parameters.
Figure 7:
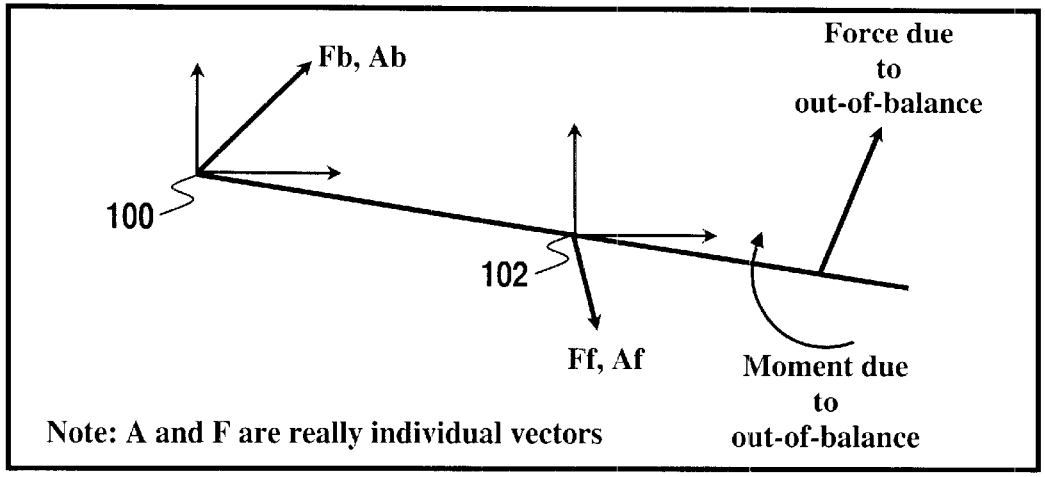

FIGS. 6 and 7 show the measurement of forces and accelerations in three-dimensional space at various locations along the shaft 52. Viewing FIGS. 6 and 7 together, it can be seen that the forces and accelerations can be measured at two coincident locations on the shaft 52. It can be appreciated, however, that this coincidence of the first force and the first acceleration or the second force and the second acceleration are not requirements of the present invention. At each of the first and second locations 100 and 102 the effects of rotating out-of-balance forces are determined along the horizontal (h) and vertical (v) coordinates. Those skilled in the art can appreciate that the coordinates shown in FIGS. 6 and 7 illustrate the fact that the concepts taught in U.S. Pat. No. 5,561,993 and the present invention operate with information describing the forces and accelerations (motions) in terms of a magnitude along a fixed direction and an associated rotating drum angle.

TABLE I

| VARIABLE | DESCRIPTION |
|---|---|
| Inputs | |
| $\Delta m_{front\_cb}$ | Test counterbalance mass placed in the front plane (vector) |
| $\Delta m_{back\_cb}$ | Test counterbalance mass placed in the back plane (vector) |
| $\omega_{back}$ | Speed of rotation in (rad/sec) at which the back plane test counterbalance occurred |
| $\omega_{front}$ | Speed of rotation in (rad/sec) at which the front plane test counterbalance occurred |
| r | Radius of counterbalance placement (inches) |
| $\omega$ | Current speed of rotation |
| Outputs | |
| $f_{back}$ | Back force sensor (lbf) (vector) |
| $f_{front}$ | Front force sensor (lbf) (vector) |
| $a_{back}$ | Back accelerometer sensor (in/sec$^2$) (vector) |
| $a_{front}$ | Front accelerometer sensor (in/sec$^2$) (vector) |

TABLE I-continued

| VARIABLE | DESCRIPTION |
|---|---|
| Actions | |
| $m_{backplane\_cb}$ | Estimated backplane counterbalance to drive sensor readings to zero (vector) |
| $m_{frontplane\_cb}$ | Estimated frontplane counterbalance to drive sensor readings to zero (vector) |

For the following discussion, Table I illustrates the inputs and outputs utilized in the multi-input/multi-output condition relating to the invention described in U.S. Pat. No. 5,561,993. In order to find the appropriate solutions for the counterbalance forces described above, measured forces and accelerations should be considered in the balancing of system forces and moments. As described above, the counterbalance masses, forces and accelerations represent magnitudes and angles. Therefore, all variables shown in Table I, except r and ω, generally comprise both a magnitude and an angle in polar coordinates, which can be converted to complex coordinates. The relationship described in equation 5 above can be rewritten for the multi-input/multi-output case using the terms described in Table I. The result is four coupled simultaneous equations, incorporating the effects of perturbations in both front and back planes that could have occurred at rotational speeds slightly different from the current speed. These four relationships are shown below and identified as equation 6.

$$a_{back4} = -\left(\frac{a_{back1} - a_{back0}}{r \cdot \omega_{back}^2 \cdot \Delta m_{back\_cb}}\right) \cdot r \cdot \omega^2 \cdot m_{backplane\_cb} - \left(\frac{a_{back3} - a_{back2}}{r \cdot \omega_{front}^2 \cdot \Delta m_{front\_cb}}\right) \cdot r \cdot \omega^2 \cdot m_{frontplane\_cb} \quad (6)$$

$$a_{front4} = -\left(\frac{a_{front1} - a_{front0}}{r \cdot \omega_{back}^2 \cdot \Delta m_{back\_cb}}\right) \cdot r \cdot \omega^2 \cdot m_{backplane\_cb} - \left(\frac{a_{front3} - a_{front2}}{r \cdot \omega_{front}^2 \cdot \Delta m_{front\_cb}}\right) \cdot r \cdot \omega^2 \cdot m_{frontplane\_cb}$$

$$f_{back4} = -\left(\frac{f_{back1} - f_{back0}}{r \cdot \omega_{back}^2 \cdot \Delta m_{back\_cb}}\right) \cdot r \cdot \omega^2 \cdot m_{backplane\_cb} - \left(\frac{f_{back3} - f_{back2}}{r \cdot \omega_{front}^2 \cdot \Delta m_{front\_cb}}\right) \cdot r \cdot \omega^2 \cdot m_{frontplane\_cb}$$

$$f_{front4} = -\left(\frac{f_{front1} - f_{front0}}{r \cdot \omega_{back}^2 \cdot \Delta m_{back\_cb}}\right) \cdot r \cdot \omega^2 \cdot m_{backplane\_cb} - \left(\frac{f_{front3} - f_{front2}}{r \cdot \omega_{front}^2 \cdot \Delta m_{front\_cb}}\right) \cdot r \cdot \omega^2 \cdot m_{frontplane\_cb}$$

The four mathematical relationships illustrated in equation 6 above can be grouped together and treated as a matrix equation in the following discussion. The meanings of the subscripts in equation 6 above are identified in Table II.

TABLE II

| SUBSCRIPT | MEANING |
|---|---|
| 0 | measurement prior to back plane counterbalance test mass $\Delta m_{back\_cb}$ |
| 1 | measurement after back plane counterbalance test mass $\Delta m_{back\_cb}$ |
| 2 | measurement prior to front plane counterbalance test mass $\Delta m_{front\_cb}$ |
| 3 | measurement after front plane counterbalance test mass $\Delta m_{front\_cb}$ |
| 4 | current sensor measurement |

The relationships shown above in equation 6 can be applied to equation 5 in matrix form as:

$$\begin{bmatrix} a_{back4} \\ a_{front4} \\ f_{back4} \\ f_{front4} \end{bmatrix} = \quad (7)$$

$$-\begin{bmatrix} \frac{a_{back1} - a_{back0}}{r \cdot \omega_{back}^2 \Delta m_{back\_cb}} & \frac{a_{back3} - a_{back2}}{r \cdot \omega_{front}^2 \Delta m_{front\_cb}} \\ \frac{a_{front1} - a_{front0}}{r \cdot \omega_{back}^2 \Delta m_{back\_cb}} & \frac{a_{front3} - a_{front2}}{r \cdot \omega_{front}^2 \Delta m_{front\_cb}} \\ \frac{f_{back1} - f_{back0}}{r \cdot \omega_{back}^2 \Delta m_{back\_cb}} & \frac{f_{back3} - f_{back2}}{r \cdot \omega_{front}^2 \Delta m_{front\_cb}} \\ \frac{f_{front1} - a_{front0}}{r \cdot \omega_{back}^2 \Delta m_{back\_cb}} & \frac{f_{front3} - f_{front2}}{r \cdot \omega_{front}^2 \Delta m_{front\_cb}} \end{bmatrix} \cdot \begin{bmatrix} m_{backplane\_cb} \\ m_{frontplane\_cb} \end{bmatrix} \cdot r \cdot \omega^2$$

where we describe this matrix equation as being in the form b=Ax and $$A = -\frac{\partial f(m)}{\partial m} = -\begin{bmatrix} \frac{a_{back1} - a_{back0}}{r \cdot \omega_{back}^2 \cdot \Delta m_{back\_cb}} & \frac{a_{back3} - a_{back2}}{r \cdot \omega_{front}^2 \cdot \Delta m_{front\_cb}} \\ \frac{a_{front1} - a_{front0}}{r \cdot \omega_{back}^2 \cdot \Delta m_{back\_cb}} & \frac{a_{front3} - a_{front2}}{r \cdot \omega_{front}^2 \cdot \Delta m_{front\_cb}} \\ \frac{f_{back1} - f_{back0}}{r \cdot \omega_{back}^2 \cdot \Delta m_{back\_cb}} & \frac{f_{back3} - f_{back2}}{r \cdot \omega_{front}^2 \cdot \Delta m_{front\_cb}} \\ \frac{f_{front1} - a_{front0}}{r \cdot \omega_{back}^2 \cdot \Delta m_{back\_cb}} & \frac{f_{front3} - f_{front2}}{r \cdot \omega_{front}^2 \cdot \Delta m_{front\_cb}} \end{bmatrix} \quad (8)$$

Equations 6, 7 and 8 depict the mathematical model generally described in U.S. Pat. No. 5,561,993. This mathematical model is formulated such that the dynamics of the system are divided into two columns based on whether mass is placed in the front plane (i.e., column 2) or the back plane (i.e., column 1) of the spinner. The present invention disclosed herein can be used with this control model or like extensions, the more general solution of which allows for the placement of mass in both the front and the back plane simultaneously to formulate the control model and apply control actions and covers the case where more than two inputs to the system can be utilized.

The equation relationships shown in equation 7 can be rewritten in matrix format to solve for the counterbalance masses $m_{backplane\_cb}$ and $m_{frontplane\_cb}$ required to bring the system into balance in the same manner as described in U.S. Pat. No. 5,561,993. For the case of four sensors and using the A matrix of equation 8, this can be expressed through equation 9 as:

$$r \cdot \omega \cdot \begin{bmatrix} m_{\text{backplane\_cb}} \\ m_{\text{frontplane\_cb}} \end{bmatrix} = -A^+ \cdot \begin{bmatrix} a_{\text{back}} \\ a_{\text{front}} \\ f_{\text{back}} \\ f_{\text{front}} \end{bmatrix} \quad (9)$$

In a situation such as that described by equation 9 above, four sensor values (i.e., two accelerations and two forces) are known from measurements and two counterbalance forces are unknown. This results in a situation where there are more equations than unknowns as each sensor provides an equation and there are only two unknown counterbalance forces for the front and back planes of the drum. This condition describes an over-determined system. An over-determined system may have more than one possible solution and a technique is generally required to solve for more equations than unknowns in an optimal manner.

A technique for solving equations of this type in a balancing scheme should find a solution that minimizes all of the sensor readings and also minimizes the amount of counterbalance media required to balance the rotating system. In other words, the force sensors and the accelerometers should all be driven as close to zero as possible by the selected counterbalances and the total amount of counterbalance media (i.e., fluid or mass) applied should be minimized.

Those skilled in the art can appreciate that a mathematical technique which may solve this problem involves computation of the pseudo-inverse of the A matrix ($A^+$) utilizing the singular value decomposition (SVD) technique. This solution method finds the optimal solution to the over-determined system shown in equation 9. The SVD is one of several techniques that can support the pseudo-inverse calculation for control. It can provide optimal control for both inputs and outputs of the modeled system. Other variations of the components that make up the SVD can be used alone but would not provide both input and output optimization. This procedure is fully described in U.S. Pat. No. 5,561,993 and is well known to those skilled in the art. It is also described in significant detail in various reference linear algebra textbooks.

After generating the solution to equation 9, it can be necessary to formulate a practical approach to applying the counterbalance mass to the rotating member and then evaluating the member to verify that the control action had the desired balancing affect. An approach to applying counterbalance and verifying the control action effect is fully described in U.S. Pat. No. 5,561,993, which is incorporated herein by reference. Those skilled in the art can appreciate that the approaches to applying counterbalance and verifying the control action effect, which were disclosed in U.S. Pat. No. 5,561,993, do not limit the scope of the present invention. The features, techniques, methods and systems disclosed in U.S. Pat. No. 5,561,993 are described herein for illustrative and background purposes only.

To accomplish balance control, balance control actions may place mass at the periphery of axial control planes on the centrifuge. Sensor measurements can be used to assess the immediate balance conditions through the use of measurement thresholds, established to direct the course of balance control. Measurements of the forces and motions at various locations within the rotatable apparatus are made before and after each control action and can be used to update the control model described by equations 7 through 9. That updated model along with further sensor measurements can be utilized to determine a prediction of the next required counterbalance control action. This process continues until balance condition is achieved (i.e., all sensor values below balance threshold) at full operating speed.

The determined desired counterbalance control action is generally represented as a force or mass (regarding $r\omega^2$) magnitude to be applied at a specific angular point along the periphery of an axial control plane on the centrifuge, i.e., a radial vector. To affect the desired control action, actuation techniques place mass across a ringed distribution of retaining receptacles contained within the axial control plane of the rotating apparatus. For a large number of retaining receptacles, counterbalance mass could simply be distributed at an angular span symmetric about the determined counterbalance angular point. Such a technique for distributing counterbalance mass does not take into account that a mechanically and monetarily feasible device would be confined to having a limited number of receptacles. With fewer receptacles, the mass is less confined and it is not possible to affect the desired control action with a simple symmetric distribution about the determined counterbalance angular point.

The present invention discloses methods and systems to affect a desired balance control action whereby counterbalance mass is distributed about the rotating system utilizing a limited number of retaining receptacles. Given a counterbalance force or mass (regarding $r\omega^2$) magnitude to be applied at a specific angular point of the axial control plane within the rotating apparatus, this control action can be accomplished through the placement of mass across a ringed distribution of retaining receptacles on the axial control plane. A variety of control action actuation techniques have been developed for transferring balancing mass to the retaining receptacles on the rotating apparatus from either within the rotating apparatus or from its stationary surroundings. The actuation technique in no way limits the scope of the present invention. For the purpose of this detailed description, consider actuation from the stationary surroundings to the rotating apparatus. This technique provides a limited amount of mass, at a characterized flow rate, distributed across a span of receptacles only once per revolution. The number of receptacles is greatly restricted so a mass placement algorithm is used to determine how mass can be proportioned across a span of receptacles and incrementally applied to efficiently affect the desired radial counterbalance force at its designated angular point-location. The counterbalance mass distribution can be determined such that force elements normal to the counterbalance angular point-location, and introduced because of the distributed control action, cancel each other or sum to zero.

Depending on the limited number of retention receptacles and the preferred angular span for distributing counterbalance mass, the mass placement algorithm may first place a designated mass, associated with a known or characterized flow rate and actuation time of a control actuator, into a primary receptacle or cup. The primary receptacle is associated with the counterbalance angular point-location. It then may include alternating, adjacent, receptacles, until the preferred angular span is reached, where the last receptacle is used to zero any remaining force component that is normal to the desired counter-balance action direction. There can be additional limit and sizing activities that ensure that an integer number of incremental steps is used to achieve the total desired counterbalance point-mass effect and that actuator timing limits are not violated. As the number of ringed retention receptacles increases, the need for the mass placement algorithm becomes less critical as a symmetric distribution of counterbalance mass about the determined angular point location becomes reasonable: the error in distributed mass placement is bound by one receptacle.

Figure 8:
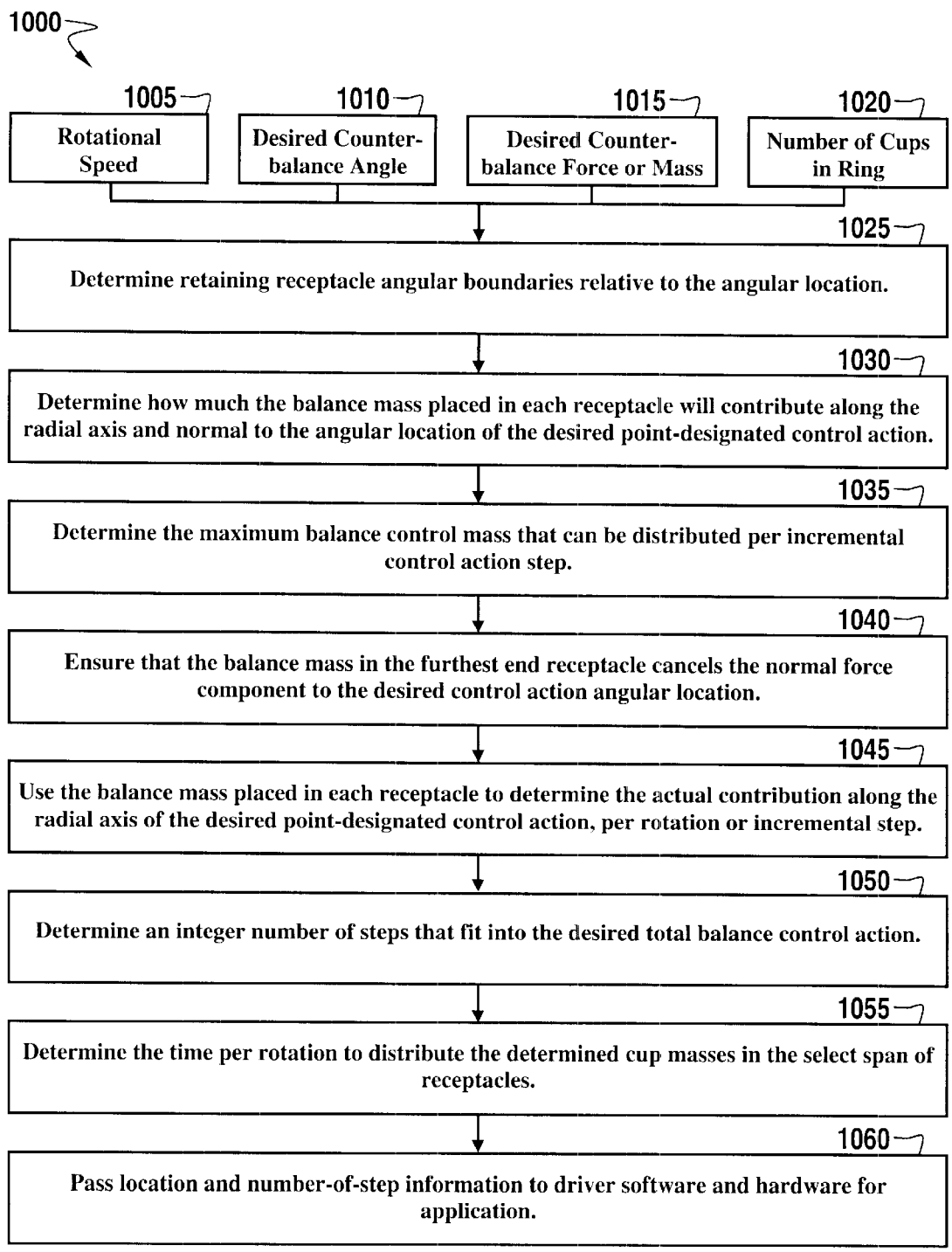
FIG. 8 illustrates a high-level flow chart of operations illustrative of operational steps that can be utilized in accordance with the preferred embodiments of the present invention.

FIG. 8 depicts a high-level flow chart 1000 of operations illustrating operational and logical steps that can be implemented in accordance with the present invention. Those skilled in the art can appreciate that flow chart 1000 depicts one possible operational methodology that can be implemented in accordance with one or more potential embodiments of the present invention. Other operational methodologies can also be utilized to implement embodiments of the present invention. Flow chart 1000 of FIG. 8 is thus presented for illustrative purposes only. FIG. 8 depicts a general method for actively placing balancing mass on a rotatable member containing a limited (e.g., two or more) number of retaining receptacles. The placing of balancing mass is associated with control model formulations, a prediction of balance control actions, and balance control actions that cancel rotational imbalances. FIG. 8 also represents a general mass placement algorithm that achieves the desired point-mass and point-location counterbalance actions through a distributed placement of mass across a span of the limited number of receiving receptacles on the rotating body. Generally stated, the objective of such a mass placement algorithm (i.e., mass placement technique) is to place enough mass in receptacles to have an impact along the radial-axis of the desired counter-balance action with acceptable inefficiency associated with the distributed placement. An additional objective of such a mass placement algorithm or mass placement technique is place mass in such a manner that all the normal elements of force that are introduced because of the distributed action, cancel each other or sum to zero.

Referring to FIG. 8, as indicated at blocks 1005, 1010, 1015, and 1020, various inputs are needed for the present algorithm to calculate the distributed mass placement to accomplish the desired control action. The rotational speeds, desired counter-balance angular point-location, desired counterbalance force or mass, and number of mass placement sites associated with the rotating system requiring balancing all factor into the calculation of the mass placement. The rotational speed can thus be measured, as illustrated at block 1005. The desired counter-balance angle, as illustrated at block 1010, and a counter-balance force or mass, as depicted at block 1015, can be determined from a control model built from sensor measurements of system response to previous control actions. Such sensors are generally placed about and/or throughout the rotating system requiring balancing. The aforementioned operational steps describe merely one potential method of obtaining such variables, and those skilled in the art can appreciate that other methods can also be implemented, in accordance with alternative embodiments of the present invention. The number of mass placement sites, receptacles, or cups about a ring within the axial control plane can essentially be represented as a constant defined by the system itself, but can also be defined by other methods. Note that the system itself can contain a number of cups (i.e., receiving receptacles) arranged in a ring, as illustrated at block 1020.

The present embodiment described herein illustrates a rotational system with eight mass placement sites. An eight-site case is described herein because it presents the simplest case where the full complexity of the present invention can be described. However, it should be understood that this is for demonstrational purposes only. One skilled in the art would realize that rotational systems having a different number of mass placement sites can also be implemented in accordance with the contemplated scope of the present invention.

As illustrated at block 1025 of FIG. 8, the desired counter-balance angle can be utilized determine the primary, secondary, tertiary and any additional mass placement sites about the rotating system. The primary site is that which the present control action angle passes through. The secondary mass placement site is the site adjacent to the primary site on the side favored by the desired counter-balance action angle. The tertiary mass placement site is the receptacle adjacent to the primary receptacle on the side opposite the secondary receptacle. Additional receptacles line up about the rotating system such that even numbered sites are all on one side of the primary site and odd numbered sites are all on the other side. This site numbering system can be clarified with reference to FIG. 9, which shows a simple model of the mass placement sites as well as the desired counterbalance vector. Utilizing this numbering system, receptacle or cup boundaries are defined for various desired counterbalances.

Figure 9:
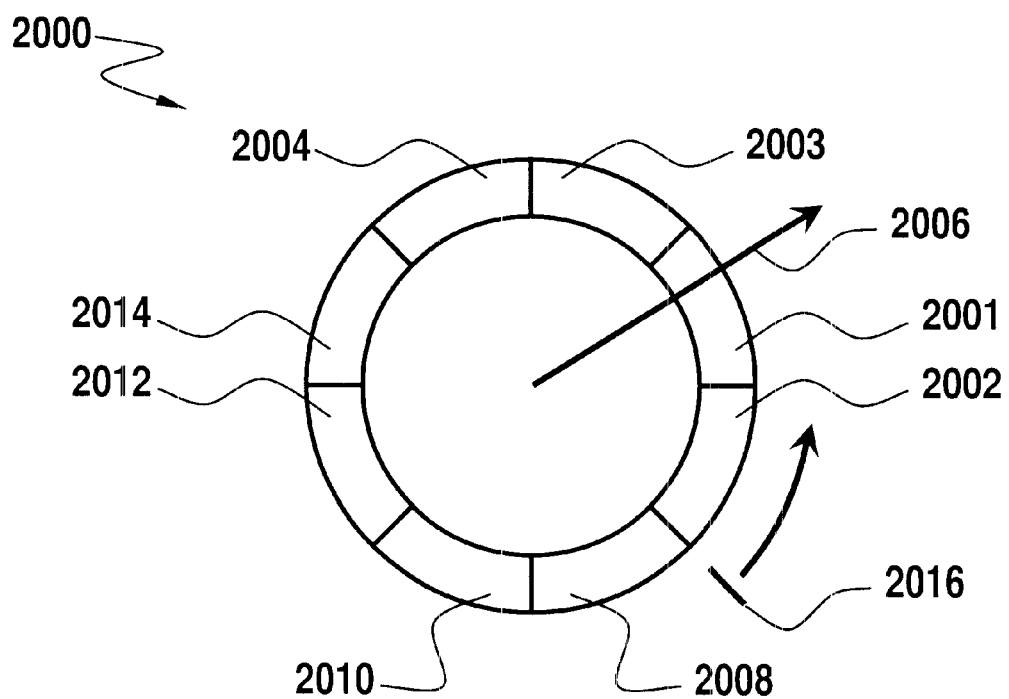
FIG. 9 depicts a graphical representation of possible mass placement sites about a rotating system in accordance with a preferred embodiment of the present invention.

For illustrative purposes, consider a desired counterbalance vector consistent with FIG. 9 thus representing a location anywhere from the center of the primary receptacle to its outer counterclockwise edge. For this illustrative example, angles on the rotating apparatus are designated as increasing in a counterclockwise direction and 0° mark is designated at the most clockwise edge of the tertiary receptacle, which is adjacent to the primary receptacle in the clockwise direction. This designation in no way restricts the scope of the present invention and is made for illustrative purposes only. The angular location of the desired counter-balance vectors is shown in equation 10.

$$\frac{\pi}{2} \geq \theta \geq 3 \cdot \frac{\pi}{8} \tag{10}$$

Rotational speeds impact mass distribution due to actuator timing constraints and mass placement resolution that come into play at higher speeds. For this example rotational speeds from 100 to 1100 revolutions per minute (rpm) were of interest. The rotational speed is represented as shown in equation 11 and is in revolutions per minute (rpm).

$$\text{rpm} = \text{rotational speed} \tag{11}$$

The radius of the rotating device needs to be known for radial force computations and is designated in equation 12, inches, for the illustrative purposes of this description.

$$r = 10 \tag{12}$$

For the particular cases of this example, the primary (p), secondary (s), tertiary (t), quadruplicate (q), quintuplicate (qi) receptacle boundaries relative to the desired counter-balance angle are defined by equations 13 through 17.

Primary: (13)

$$\theta_{1p} = \theta - \left(\frac{\pi}{2}\right)$$

$$\theta_{2p} = \theta - \left(\frac{\pi}{4}\right)$$

Secondary: (14)

$$\theta_{1s} = \theta - \left(\frac{3 \cdot \pi}{4}\right)$$

$$\theta_{2s} = \theta - \left(\frac{\pi}{2}\right)$$

Tertiary: (15)

$$\theta_{1t} = \theta - \left(\frac{\pi}{4}\right)$$

$$\theta_{2t} = \theta$$

Quadruplicate: (16)

$$\theta_{1q} = \theta - \pi$$

$$\theta_{2q} = \theta - \left(\frac{3 \cdot \pi}{4}\right)$$

Quintuplicate: (17)

$$\theta_{1qi} = \theta$$

$$\theta_{2qi} = \theta + \left(\frac{\pi}{4}\right)$$

Thus, as indicated at block 1025, the retaining receptacle angular boundaries relative to the angular location of the desired point-designed balance control action can be deterred. Thereafter, as illustrated at block 1030 of FIG. 8, the manner in which the mass placed in each receptacle (e.g., cup) contributes to the desired point-action can be determined. Let x represent a force component in the radial direction of the desired counterbalance vector and y represent a force component normal to that radial direction. The x and y component contribution of each receptacle to the total counterbalance control action can be determined from the contribution factors determined in equations 18 through 22.

Primary Receptacle Contribution Factors:

$$F_{xp} = \frac{(\sin(\theta_{2p}) - \sin(\theta_{1p}))}{\frac{\pi}{4}} \quad (18)$$

$$F_{yp} = \frac{(\cos(\theta_{1p}) - \cos(\theta_{2p}))}{\frac{\pi}{4}}$$

Secondary Receptacle Contribution Factors:

$$F_{xs} = \frac{(\sin(\theta_{2s}) - \sin(\theta_{1s}))}{\frac{\pi}{4}} \quad (19)$$

$$F_{ys} = \frac{(\cos(\theta_{1s}) - \cos(\theta_{2s}))}{\frac{\pi}{4}}$$

Tertiary Receptacle Contribution Factors:

$$F_{xt} = \frac{(\sin(\theta_{2t}) - \sin(\theta_{1t}))}{\frac{\pi}{4}} \quad (20)$$

$$F_{yt} = \frac{(\cos(\theta_{1t}) - \cos(\theta_{2t}))}{\frac{\pi}{4}}$$

Quadruplicate Receptacle Contribution Factors:

$$F_{xq} = \frac{(\sin(\theta_{2q}) - \sin(\theta_{1q}))}{\frac{\pi}{4}} \quad (21)$$

$$F_{yq} = \frac{(\cos(\theta_{1q}) - \cos(\theta_{2q}))}{\frac{\pi}{4}}$$

Quintuplicate Receptacle Contribution Factors:

$$F_{xqi} = \frac{(\sin(\theta_{2qi}) - \sin(\theta_{1qi}))}{\frac{\pi}{4}} \quad (22)$$

$$F_{yqi} = \frac{(\cos(\theta_{1qi}) - \cos(\theta_{2qi}))}{\frac{\pi}{4}}$$

Thus, as depicted at block 1030, the amount of mass (i.e., balancing mass) placed in each receptacle that contributes along the radial axis and normal to the angular location of the desired point-designated control action can be determined. These are contribution factors. As illustrated at blocks 1035, 1040, and 1045 of FIG. 8, once these force component contribution factors are determined, the maximum possible contribution of various mass placement distributions, to the desired counterbalance control action, can be determined. Given the limited number of receptacles, there is a maximum contribution associated with a 2-cup, 3-cup, 4-cup, etc., distribution that can be determined. The maximum force contribution is the force that would be generated if the maximum amount of mass capable of being placed in a span of cups were placed in such cups, with the last cup mass limited so as to zero the force component normal to the direction of the desired counterbalance action. Thus the maximum 2-cup force would be achieved by placing the greatest possible amount of mass in the primary receptacle and placing only enough mass in the secondary receptacle so as to cancel any normal force components introduced by the primary receptacles mass. The 3-cup would place the greatest possible amount of mass in the primary and secondary, and use the tertiary receptacle to zero the normal force component introduced by the primary and secondary receptacle masses. For purposes of this illustrative example we extended this method to find the 4-cup and 5-cup maximum as well.

For this description, the control actuation places mass on the rotating apparatus from the stationary surrounding. Thus, there is a respective time span associated with the various maximum possible contributions and during which mass can be placed into a given span of receptacles during one revolution of the rotating apparatus. This time span is defined by the receiving receptacle's position with respect to a given reference point of the system and the current angular velocity of the rotating system. The time span of a single receptacle $t_{1cup}$ and the flow rate fr provided by the control actuation technique defines the most mass $M_p$ that can be placed in a single receptacle per revolution, as shown in equations 23 and 24. The flow rate of the control actuation technique may not be constant and the relation in equation 24 may need to be more involved; an actuator characterization may need to be used to estimate the single receptacle mass based on a flow rate for a typical control action time span.

$$t_{1cup} = \left(\frac{1}{\text{rpm}}\right) \cdot (60) \cdot \left(\frac{1}{8}\right) \quad (23)$$

$$M_p = f(t_{1cup}, fr) = t_{1cup} \cdot fr \quad (24)$$

The contribution factors and maximum single receptacle mass can now be used to determine the individual receptacle masses and total maximum force contribution associated with the various multi-cup maximum distributions. The total mass placed and the flow rate fr can be used to determine the time span associated with placing the mass in the receptacles. These computations are shown in equations 25 through 46.

Two-cup mass distribution, time span (seconds), and force contribution:

$$M_{2p} = M_p \tag{25}$$

$$M_{2s} = -\left(\frac{F_{yp}}{F_{ys}}\right) \cdot M_{2p} \tag{26}$$

$$t_{2\max} = \frac{(M_{2p} + M_{2s})}{fr} \tag{27}$$

$$f_{2\max} = \left[ [(F_{xp} \cdot M_{2p}) + (F_{xs} \cdot M_{2s})] \cdot r \cdot \left(\frac{2 \cdot \pi \cdot \text{rpm}}{60}\right)^2 \right] \tag{28}$$

Three-cup mass distribution, time span (seconds), and force contribution:

$$M_{3p} = M_p \tag{29}$$

$$M_{3s} = M_p \tag{30}$$

$$M_{3t} = -\left(\frac{F_{yp}}{F_{yt}}\right) \cdot M_{3p} - \left(\frac{F_{ys}}{F_{yt}}\right) \cdot M_{3s} \tag{31}$$

$$t_{3\max} = \frac{(M_{3p} + M_{3s} + M_{3t})}{fr} \tag{32}$$

$$f_{3\max} = \left[ [(F_{xp} \cdot M_{3p}) + (F_{xs} \cdot M_{3s}) + (F_{xt} \cdot M_{3t})] \cdot r \cdot \left(\frac{2 \cdot \pi \cdot \text{rpm}}{60}\right)^2 \right] \tag{33}$$

Four-Cup Mass Distribution, Time Span (Seconds), and Force Contribution:

$$M_{4p} = M_p \tag{34}$$

$$M_{4s} = M_p \tag{35}$$

$$M_{4t} = M_p \tag{36}$$

$$M_{4q} = -\left(\frac{F_{yp}}{F_{yq}}\right) \cdot M_{4p} - \left(\frac{F_{ys}}{F_{yq}}\right) \cdot M_{4s} - \left(\frac{F_{yt}}{F_{yq}}\right) \cdot M_{4t} \tag{37}$$

$$t_{4\max} = \frac{(M_{4p} + M_{4s} + M_{4t} + M_{4q})}{fr} \tag{38}$$

$$f_{4\max} = [(F_{xp} \cdot M_{4p}) + (F_{xs} \cdot M_{4s}) + (F_{xt} \cdot M_{4t}) + (F_{xq} \cdot M_{4q})] \cdot r \cdot \left(\frac{2 \cdot \pi \cdot \text{rpm}}{60}\right)^2 \tag{39}$$

Five-Cup Mass Distribution, Time Span (Seconds), and Force Contribution:

$$M_{5p} = M_p \tag{40}$$

$$M_{5s} = M_p \tag{41}$$

$$M_{5t} = M_p \tag{42}$$

$$M_{5q} = M_p \tag{43}$$

$$M_{5qi} = -\left(\frac{F_{yp}}{F_{yqi}}\right) \cdot M_{5p} - \left(\frac{F_{ys}}{F_{yqi}}\right) \cdot M_{5s} - \left(\frac{F_{yt}}{F_{yqi}}\right) \cdot M_{5t} - \left(\frac{F_{yq}}{F_{yqi}}\right) \cdot M_{5q} \tag{44}$$

$$t_{5\max} = \frac{(M_{5p} + M_{5s} + M_{5t} + M_{5q} + M_{5qi})}{fr} \tag{45}$$

$$f_{5\max} = \left[ \begin{array}{c} (F_{xp} \cdot M_{5p}) + (F_{xs} \cdot M_{5s}) + (F_{xt} \cdot M_{5t}) + \\ (F_{xq} \cdot M_{5q}) + (F_{xqi} \cdot M_{5qi}) \end{array} \right] \cdot r \cdot \left(\frac{2 \cdot \pi \cdot \text{rpm}}{60}\right)^2 \tag{46}$$

If the forces resulting from equations 39 and 46 were compared, it would be seen that they are equal. This makes sense as by filling the quadruplicate receptacle and using the quintuplicate receptacle to cancel the remaining normal force component, negative "on-axis" force terms are introduced because a 180° span has been exceeded. Thus, even though more mass is placed on the rotating system, the fifth receptacle does not contribute to the desired counterbalance control action. This would be true for any number of ringed receptacles where the mass distribution includes receptacles that share a line passing through the center of the rotating apparatus. This is an important fact later when resizing the mass distribution is considered: any extension beyond four receptacles will need to go beyond five receptacles in order to effect the contribution to the desired control action.

Thus, as depicted at block 1035, a determination can be made regarding the maximum balance control mass that can be distributed per incremental control action step, given the characteristics of the mechanism for distributing balancing mass across receptacles, the speed of rotation, and the desired distribution efficiency. As illustrated at block 1040, an operation can be performed to determine and ensure that the balancing mass (i.e., balance mass) in the furthest end receptacle of the desired distribution cancels the normal force component to the desired control action angular location that was introduced by balancing mass placed in other receptacles of the distribution. This will essentially comprise some portion of the most mass that can be placed in a single receptacle per incremental control action step. As indicated at block 1045, an operation can be performed the balancing mass placed in each receptacle, along with an associated contribution factor, is utilized to determine the actual contribution along the radial axis of the desired point-designated control action, per rotation or incremental step. It is presumed that multiple incremental steps can be required to achieve the total desired balance control action. Note that as utilized herein, the term "balance mass" and "balancing mass" can be utilized interchangeably.

As illustrated at block 1050 of FIG. 8, using the results for the maximum contribution multi-cup mass distributions, the distribution may need to be resized and control actuator limits considered, so that the total desired control action can be incrementally achieved. Block 1050 generally described an operation in which an integer of steps that fit into the desired total control action can be determined, with the contribution per incremental control actions step. The contribution-per-step can be resized so that the desired action is attained in an integer number of steps. This can involve adjusting end-receptacle masses or utilizing more or less receptacles as appropriate. Limitations on the mass placement mechanism may also be addressed (e.g., minimum on time).

In accordance with a preferred embodiment of the invention, a valve for injecting fluid balance mass into the retaining receptacles from the stationary reference frame of the rotating system can be utilized. A minimum valve on time is generally associated with this valve, which can define a minimum mass distribution time and the associated lower limit of mass that can be added to the rotating apparatus in a given increment, or injection, of the control action. This minimum mass distribution time also limits the smallest angular span that mass can be distributed across: at low rotational speeds this is generally not a concern, but at higher rotational speeds this smallest angular span should remain less than 180° and assumed to be the case.

With the possible range of efficient incremental actions (i.e., mass per rotation) ranging from the mass that can be placed in the smallest angular span to that of a 4-cup maximum contribution, the incremental action can be resized such that an integer number of actions can be used to accomplish the total desired counterbalance control action. Several rotations of the system would therefore normally be needed before the desired mass counter-balance can be injected. If the incremental control action ultimately needs to be less than the minimum mass distribution time will allow, there are less efficient ways to accomplish the desired control action by extending the mass distribution beyond the fourth and fifth receptacle, the simplest being to simply distribute across the entire ring of receptacles and overlap for the desired time that is less than the minimum mass distribution time; this is referred to throughout as a "wrap".

The minimum mass distribution time for the current embodiment is defined by system limitations to be $t_{min\_on}$= 0.015 seconds. Given this, the minimum mass that can be injected in one rotation of the system would be as shown in equation 47.

$$M_{mimin\_on} = t_{min\_on} \cdot fr \quad (47)$$

A comparison of the minimum distribution time can be made with the 2-cup, 3-cup, and 4-cup maximum times of equations 27, 32, and 38, respectively. If the minimum distribution time is less than the 2-cup maximum time of equation 27, then the maximum 2-cup contribution, described by equations 25 through 28, can be scaled down to determine the minimum force contribution associated with the minimum distribution time. If the minimum distribution time falls between the 2-cup and 3-cup maximum times of equations 27 and 32, the maximum 3-cup contribution, described in equations 29 through 33, can be scaled down to determine the minimum force contribution associated with the minimum distribution time. Likewise, if the minimum distribution time falls between the 3-cup and 4-cup maximum times of equations 32 and 38, the maximum 4-cup contribution, described in equations 34 through 39, can be scaled down to determine the minimum force contribution associated with the minimum distribution time.

Lastly, if the minimum distribution time is greater than the 4-cup maximum time of equation 38, then a "wrap" operation is designated to accomplish the minimum force contribution. Utilizing the minimum mass that can be injected from equation 47, and the contribution factors from equations 19 through 21, along with the maximum-contribution receptacle masses included in equations 25 through 39, the 2-cup, 3-cup, and 4-cup scale down relations are described by equations 48 through 54. The decision process described above for selecting the correct scale down operation is mathematically shown in equation 55. It should be noted that this scale down is here only to calculate the minimum force contribution associated with the minimum distribution time and the minimum increment for efficiently building to the total desired control action needed to bring the rotating system into a balanced state.

2-cup size-down relations:

$$f_{2min\_on} = \left[\left[\left[F_{xp} \cdot \frac{M_{2p}}{M_{2p} + M_{2s}} \cdot M_{min\_on}\right] + \left[F_{xs} \cdot \frac{M_{2s}}{M_{2p} + M_{2s}} \cdot M_{min\_on}\right]\right] \cdot r \cdot \left(\frac{2 \cdot \pi \cdot \text{rpm}}{60}\right)^2\right] \quad (48)$$

3-cup size-down relations:

$$M_{3tmin\_on} = \frac{-\left(\frac{F_{yp}}{F_{yt}}\right) \cdot M_{3p} - \left(\frac{F_{ys}}{F_{yt}}\right) \cdot (M_{min\_on} - M_{3p})}{\left(1 - \frac{F_{ys}}{F_{yt}}\right)} \quad (49)$$

$$M_{3smin\_on} = M_{min\_on} - M_{3p} - M_{3tmin\_on} \quad (50)$$

$$f_{3min\_on} = [[(F_{xp} \cdot M_{3p}) + (F_{xs} \cdot M_{3smin\_on}) + (F_{xt} \cdot M_{3tmin\_on})] \cdot r \cdot \left(\frac{2 \cdot \pi \cdot \text{rpm}}{60}\right)^2] \quad (51)$$

4-cup size-down relations:

$$M_{4qmin\_on} = \frac{-\left(\frac{F_{yp}}{F_{yq}}\right) \cdot M_{4p} - \left(\frac{F_{ys}}{F_{yq}}\right) \cdot M_{4s} - \left(\frac{F_{yt}}{F_{yq}}\right) \cdot (M_{min\_on} - M_{4p} - M_{4s})}{\left(1 - \frac{F_{yt}}{F_{yq}}\right)} \quad (52)$$

$$M_{4tmin\_on} = M_{min\_on} - M_{4p} - M_{4s} - M_{4qmin\_on} \quad (53)$$

$$f_{4min\_on} = [[(F_{xp} \cdot M_{4p}) + (F_{xs} \cdot M_{4s}) + (F_{xt} \cdot M_{4tmin\_on}) + (F_{xq} \cdot M_{4qmin\_on})] \cdot r \cdot \left(\frac{2 \cdot \pi \cdot \text{rpm}}{60}\right)^2] \quad (54)$$

The mathematically represented decision process for selecting the results of equations 48, 51, or 54 as the correct scale down operation for determining the minimum force contribution:

$$f_{min\_on} = \begin{cases} f_{2min\_on} & \text{if } t_{min\_on} \leq t_{2max} \\ f_{3min\_on} & \text{if } t_{2max} < t_{min\_on} \leq t_{3max} \\ f_{4min\_on} & \text{if } t_{3max} < t_{min\_on} \leq t_{4max} \\ \text{wrap} & \text{otherwise} \end{cases} \quad (55)$$

The minimum and maximum possible force contribution per incremental action (i.e., mass per rotation), based on rotational speed, actuator limits, and number of receptacles, are now determined. Given the total desired control action $f_{cb}$, an incremental action between the minimum and maximum possible force contributions can now be determined such that an integer number of increments lead to the total desired control action. The preferred incremental action would be within a 120° span of the ringed receptacles due to efficient use of available counterbalance mass and the limited volume of receptacles. Thus, for this illustrative example, a 3-cup action, described in equations 29 through 33, would be the preferred incremental action and can be used as a starting point. Equations 56 and 57 show the preferred number of incremental actions $n_{inj}$ and the incremental force contribution $f_{inj}$ given the total desired control action $f_{cb}$. The ceiling function in equation 56 will round up to the nearest integer value; thus the resulting $f_{inj}$ will be a size-down of the maximum 3-cup contribution.

$$n_{inj} = \text{ceil}\left(\frac{f_{cb}}{f_{3\max}}\right) \quad (56)$$

$$f_{inj} = \left(\frac{f_{cb}}{n_{inj}}\right) \quad (57)$$

The resulting 3-cup sized-down incremental action can now be checked against receptacle limits and minimum actuation limits. The incremental action can be further adjusted if limits interfere with the preferred incremental action: it could be reduced to a 2-cup action, increased to a 4-cup action, or designated for a "wrap" action. Equation 58 shows a method for checking limits and determining the final number of receptacles and the number of increments to accomplish the incremental action. In equation 58, the variable InjSelect is an array of 3-element vectors whose components are: the number of cups to use in computing the incremental action, the number of incremental actions to accomplish the total desired control action, and whether or not a "wrap" action is required (1=wrap, 0=no wrap).

$$\text{InjSelect} = \begin{vmatrix} \text{if } f_{inj} \geq f_{\min\_on} & (A) \\ \quad \text{result} \leftarrow \begin{bmatrix} 2 \\ n_{inj} \\ 0 \end{bmatrix} \text{ if } f_{inj} \leq f_{2\max} \\ \quad \text{result} \leftarrow \begin{bmatrix} 3 \\ n_{inj} \\ 0 \end{bmatrix} \text{ if } f_{2\max} < f_{inj} \leq f_{3\max} \\ \text{if } (f_{inj} < f_{\min\_on}) \cdot (n_{inj} > 1) & (B) \\ \quad n_{temp} \leftarrow n_{inj} - 1 \\ \quad f_{temp} \leftarrow \frac{f_{cb}}{n_{temp}} \\ \quad \text{result} \leftarrow \begin{bmatrix} 4 \\ n_{temp} \\ 0 \end{bmatrix} \text{ if } f_{\min\_on} \leq f_{temp} \leq f_{4\max} \\ \quad \text{otherwise} & (C) \\ \quad \quad \text{result} \leftarrow \begin{bmatrix} 2 \\ n_{inj} \\ 1 \end{bmatrix} \text{ if } f_{inj} \leq f_{2\max} \\ \quad \quad \text{result} \leftarrow \begin{bmatrix} 3 \\ n_{inj} \\ 1 \end{bmatrix} \text{ if } f_{2\max} < f_{inj} \leq f_{3\max} \\ \text{otherwise} & (D) \\ \quad \text{result} \leftarrow \begin{bmatrix} 2 \\ n_{inj} \\ 1 \end{bmatrix} \text{ if } f_{inj} \leq f_{2\max} \\ \quad \text{result} \leftarrow \begin{bmatrix} 3 \\ n_{inj} \\ 1 \end{bmatrix} \text{ if } f_{2\max} < f_{inj} \leq f_{3\max} \\ \text{result} \end{vmatrix} \quad (58)$$

As shown in sub-part (A) of equation 58, the preferred 3-cup size-down is first checked to see whether it interferes with the minimum force contribution associated with the minimum distribution time. If not, a determination is made whether a 2-cup or 3-cup approach is most appropriate for designated force increment $f_{inj}$. This later determination is needed to avoid negative cup masses.

In sub-part (B), the case is shown where the minimum force contribution associated with the minimum distribution time interferes with the preferred 3-cup size-down. But, there are multiple incremental actions needed, which allow for the possibility to size-up the incremental action. Therefore, an attempt is made to size-up to a 4-cup incremental action by reducing the number of incremental actions and placing more mass per increment. If this leads to a force increment larger that the maximum 4-cup contribution or an incremental action still less than the minimum possible, then sub-part (C) shows the original 3-cup preferred action is reconsidered as a "wrap" action. The "wrap" action is adjusted for 2-cup or 3-cup overlap, as appropriate.

Sub-part (D) shows the case where the minimum force contribution associated with the minimum distribution time interferes with the preferred 3-cup size-down and there is only one incremental action required. Thus, the original 3-cup preferred action is reconsidered as a "wrap" action. The "wrap" action is adjusted for 2-cup or 3-cup overlap, as appropriate.

The InjSelect results of equation 58 are then used to determine the amount of mass that is to be placed in each of the receptacles and the associated actuator timing to accomplish this mass distribution per incremental action. This is represented by block 1055 in FIG. 8. Equations 59, 60, and 61 show the number of receptacles, number of incremental actions, and "wrap" status being extracted from InjSelect, respectively. These values are used in equations 62 through 66 to determine the mass per receptacle needed to accomplish the determined incremental action.

$$\text{cups} = (\text{InjSelect})_0 \quad (59)$$

$$\text{injections} = (\text{InjSelect})_1 \quad (60)$$

$$\text{wrap} = (\text{InjSelect})_2 \quad (61)$$

The mass to be placed per incremental action is $$m_{temp} = \left[\frac{\left(\frac{f_{cb}}{\text{injections}}\right)}{\left[r \cdot \left(\frac{2 \cdot \pi \cdot \text{rpm}}{60}\right)^2\right]}\right] \quad (62)$$

The mass to be injected into the primary cup would be $$M_{pr} = \begin{vmatrix} \frac{(m_{temp})}{\left[F_{xp} - \left(\frac{F_{xs} \cdot F_{yp}}{F_{ys}}\right)\right]} & \text{if cups} = 2 \\ M_{3p} \text{ if cups} = 3 \\ M_{4p} \text{ if cups} = 4 \end{vmatrix} \quad (63)$$

The mass to be injected into the secondary cup would be $$M_s = \begin{vmatrix} \frac{-F_{yp} \cdot M_{pr}}{F_{ys}} & \text{if cups} = 2 \\ \frac{(m_{temp}) - \left[\left(F_{xp} - F_{xt} \cdot \frac{F_{yp}}{F_{yt}}\right) \cdot M_{pr}\right]}{\left(F_{xs} - F_{xt} \cdot \frac{F_{ys}}{F_{yt}}\right)} & \text{if cups} = 3 \\ M_{4s} \text{ if cups} = 4 \end{vmatrix} \quad (64)$$

The mass to be injected into the tertiary cup would be $$M_t = \begin{cases} 0.0 \text{ if cups} = 2 \\ \left(\dfrac{-F_{yp}}{F_{yt}} \cdot M_{pr}\right) - \left(\dfrac{F_{ys}}{F_{yt}} \cdot M_s\right) \text{ if cups} = 3 \\ \dfrac{(m_{temp}) - \left[\left(F_{xp} - F_{xq} \cdot \dfrac{F_{yp}}{F_{yq}}\right) \cdot M_{pr}\right] - \left[\left(F_{xs} - F_{xq} \cdot \dfrac{F_{ys}}{F_{yq}}\right) \cdot M_s\right]}{\left(F_{xt} - F_{xq} \cdot \dfrac{F_{yt}}{F_{yq}}\right)} \text{ if cups} = 4 \end{cases} \quad (65)$$

The mass to be injected into the quadruplicate cup would be $$M_q = \begin{cases} 0.0 \text{ if cups} = 2 \\ 0.0 \text{ if cups} = 3 \\ -\left(\dfrac{F_{yp}}{F_{yq}}\right) \cdot M_{pr} - \left(\dfrac{F_{ys}}{F_{yq}}\right) \cdot M_s - \left(\dfrac{F_{yt}}{F_{yq}}\right) \cdot M_t \text{ if cups} = 4 \end{cases} \quad (66)$$

The location and timing information associated with this control action is passed to the control actuation operation as illustrated at block 1060 of FIG. 8. When the calculated additions are made to the corresponding receptacles of the rotating system, the system should achieve a balanced state. Looking at the force contribution per incremental action, total force and the time per injection will confirm whether forces to be added to the system were correctly calculated. The relations for doing this check are expressed in equation 67 through Utilizing the contribution factors of equations 18 through 21, and the receptacle masses determined in equations 62 through 66, the counterbalance force contribution per incremental action $f_{p\_inj}$ along the desire counterbalance angular point-location is determined as shown in equation 67 and the total control action $f_{total}$ in equation 68. The control actuation time for providing counterbalance mass to the rotatable apparatus is computed in equation 69. Thus the control actuator will provide mass at a characterized flow rate to a contiguous span of receptacles per incremental action. The distribution of the mass across the receptacles, with partial distributions possible on the end receptacles, accomplishes the desired incremental force contribution, a collection of which accomplishes the total desired counterbalance control action.

$$f_{p\_inj} = \quad (67)$$

$$[(F_{xp} \cdot M_{pr}) + (F_{xs} \cdot M_s) + (F_{xt} \cdot M_t) + (F_{xq} \cdot M_q)] \cdot r \cdot \left(\dfrac{2 \cdot \pi \cdot \text{rpm}}{60}\right)^2$$

$$f_{total} = injections \cdot f_{p\_inj} \quad (68)$$

$$t_{p\_inj} = \begin{cases} time \leftarrow \dfrac{(M_{pr} + M_s + M_t + M_q)}{fr} \\ time \text{ if wrap} = 0 \\ time + \dfrac{60}{rpm} \text{ otherwise} \end{cases} \quad (69)$$

Based on the foregoing, it can thus be appreciated that block 1055 generally describes an operation in which the time per rotation to distribute the determined cup masses in the select space of receptacles can be determined, with resized balance masses and characterization of the mass placement mechanism. Additionally, block 1055 illustrates the fact that less mass can be achieved by injecting over a smaller portion of the end-receptacles. Additionally, block 1055 depicts an operation in which specific start and stop angles or rotation times can be determined based on a reference associated with or located on the rotating device. Block 1060 simply illustrates and operation in which the location and number-of-step information is passed to the low-level mass placement mechanism's driver software and hardware application.

As indicated previously, FIG. 9 depicts a graphical representation 2000 of possible mass placement sites about a rotating system in accordance with a preferred embodiment of the present invention. FIG. 9 generally illustrates eight total receptacle sites, including a primary site 2001, a tertiary site 2002, a secondary site 2003, a quadruplicate site 2004, and a quintuplicate site 2008. Additional sits 2010, 2012, and 2014 are also indicated in FIG. 9 for a total of eight total receptacle sites. Arrow 2006 indicates a desired control action vector. While mark 2016 illustrates a 0 degree mark. Those skilled in the art can appreciate that although eight receptacle sites are illustrated in FIG. 9, the present invention can be implemented with more than or fewer than eight receptacles sites. For example, one, two, three or more receptacle sites can be implemented in accordance with a preferred embodiment of the present invention. Thus, the number of receptacle sites illustrated in FIG. 9 is not considered a limiting feature of the present invention, because the number (i.e., eight) is presented for illustrative purposes only.

Note that the present invention, as discussed herein, can be implemented in the context of a software application comprising one or more modules (i.e., software modules). The term "module" as utilized herein generally refers to a physical hardware device and/or a software module. A "software module," for example, is generally a collection of routines and data structures that performs a particular task or implements a particular abstract data type. Modules are usually composed of two parts: an interface, which lists the constants, data types, variables, and routines that can be accessed by other modules or routines, and an implementation, which is private (accessible only to the module) and which contains the source code that actually implements the routines in the module. Thus, the present invention can be implemented as a software application or software system composed of a plurality of software modules. Such a system can also include a variety of hardware elements (e.g., mechanical, electrical, and so forth), which function in association with such software modules as a unified system.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. For example, those skilled in the art can appreciate that the methods described herein, including mathematical formulations, can be implemented as a program product in the form of varying software modules, routines, and subroutines. Many modifications and variations are possible in light of the above teaching without departing from scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A method for dynamically balancing a rotating system, such that a balancing mass is placed in at least one receiving receptacle associated with said rotating system, said method comprising the steps of:
   distributing a balancing mass across a span of said at least one receiving receptacle associated with said rotating system in order to affect a balance control action;
   determining a distribution of said balancing mass and incrementally applying said balancing mass to said rotating system; and
   adjusting said distribution with regard to limitations of said at least one receiving receptacle and at least one actuation technique thereof to realize said balance control action.

2. The method of claim 1 wherein said at least one receiving receptacle comprises a plurality of receiving receptacles associated with said rotating system.

3. The method of claim 2 wherein said plurality of receiving receptacles comprises at least two receiving receptacles associated with said rotating system.

4. The method of claim 2 wherein said plurality of receiving receptacles comprises a ringed distribution of retaining receptacles located on an axial control plane associated with said rotating system.

5. The method of claim 1 wherein said balance control action comprises a balancing point-designated control action.

6. The method of claim 5 further comprising the step of:
   representing said balance control action as a force magnitude for balancing said rotating system at a specific angular point of an axial control plane associated with said rotating system.

7. The method of claim 1 wherein the step of determining a distribution of said balancing mass associated with said rotating system and incrementally applying said balancing mass to said rotating system, comprises the step of utilizing a mass placement technique applicable to said rotating system.

8. The method of claim 7 wherein said balancing mass is placed on said plurality of receiving receptacles, such that said balancing mass is distributed on said plurality of receiving receptacles in order to effect a compromise between an impact along an axis of a preferred balance control action and a total distributed mass.

9. The method of claim 8 wherein said mass placement technique permits said distribution of said balancing mass to be accomplished through an incremental motion along said axis.

10. The method of claim 9 wherein force components normal to said axis cancel one another due to said distribution of said balancing mass.

11. A system for dynamically balancing a rotating device, such that a balancing mass is placed in at least one receiving receptacle associated with said rotating device, said system comprising:
   a balancing mass distributed across a span of said at least one receiving receptacle associated with said rotating device in order to affect a balance control action;
   a module for compiling a distribution of said balancing mass;
   a module for determining an incremental application of said balancing mass that is applied to said rotating device; and
   a module for adjusting said distribution of balancing mass with regard to predetermined limitations of said at least one receiving receptacle and at least one actuation technique thereof to realize said balance control action.

12. The system of claim 11 wherein said at least one receiving receptacle comprises a plurality of receiving receptacles associated with said rotating device.

13. The system of claim 12 wherein said plurality of receiving receptacles comprises at least two receiving receptacles associated with said rotating device.

14. The system of claim 12 wherein said plurality of receiving receptacles comprises a ringed distribution of retaining receptacles located on an axial control plane associated with said rotating device.

15. The system of claim 11 wherein said balance control action comprises a balancing point-designated control action.

16. The system of claim 15 wherein said balance control action is represented as a force magnitude for balancing said rotating device at a specific angular point of an axial control plane.

17. The system of claim 11 wherein said distribution of balancing mass associated with said rotating device and said balancing mass is incrementally applied to said rotating device utilizing a mass placement technique.

18. The system of claim 17 wherein said balancing mass is distributed on said plurality of receiving receptacles in order to effect a compromise between an impact along an axis associated with a preferred balance control action and a total distributed mass.

19. The system of claim 18 wherein said mass placement technique permits said distribution of said balancing mass to be accomplished through an incremental motion along said axis.

20. The system of claim 19 wherein force components normal to said axis cancel one another due to said distribution of said balancing mass.

21. A system for dynamically balancing a rotating device, such that a balancing mass is placed in at least one receiving receptacle associated with said rotating device, said system comprising:
   a balancing mass distributed across a span of said at least one receiving receptacle associated with said rotating device in order to affect a balance control action;
   means for compiling a distribution of said balancing mass;
   means for determining an application of said balancing mass that is applied to said rotating device; and
   means for adjusting said distribution of said balancing mass with regard to predetermined limitations of said at least one receiving receptacle and at least one actuation technique thereof to realize said balance control action.

22. The system of claim 21 wherein said means for determining an application of said balancing mass further comprises means for continuously applying said balancing mass to said rotating device.

23. The system of claim 21 wherein said means for determining an application of said balancing mass further comprises means for incrementally applying said balancing mass to said rotating device.

* * * * *